US009272441B2

United States Patent
Pfau et al.

(10) Patent No.: US 9,272,441 B2
(45) Date of Patent: Mar. 1, 2016

(54) METHOD OF SEALING A POROUS FIBROUS SUBSTRATE, AND METHOD OF MAKING A DOOR

(75) Inventors: James Pfau, Kirkland, IL (US); Stephen Hart, Marengo, IL (US)

(73) Assignee: Masonite Corporation, Tampa, FL (US)

( * ) Notice: Subject to any disclaimer, the term of this patent is extended or adjusted under 35 U.S.C. 154(b) by 1022 days.

(21) Appl. No.: 12/377,448

(22) PCT Filed: Aug. 28, 2007

(86) PCT No.: PCT/US2007/018932
§ 371 (c)(1),
(2), (4) Date: Mar. 7, 2011

(87) PCT Pub. No.: WO2008/027390
PCT Pub. Date: Mar. 6, 2008

(65) Prior Publication Data
US 2011/0223411 A1    Sep. 15, 2011

Related U.S. Application Data

(60) Provisional application No. 60/840,472, filed on Aug. 28, 2006.

(51) Int. Cl.
| | |
|---|---|
| *B27N 1/00* | (2006.01) |
| *B27N 3/00* | (2006.01) |
| *B27N 7/00* | (2006.01) |
| *B29C 44/12* | (2006.01) |
| *E06B 3/72* | (2006.01) |

(52) U.S. Cl.
CPC .............. *B27N 1/006* (2013.01); *B27N 3/005* (2013.01); *B27N 7/005* (2013.01); *B29C 44/1209* (2013.01); *E06B 3/72* (2013.01); *Y10T 428/249958* (2015.04); *Y10T 442/20* (2015.04)

(58) Field of Classification Search
CPC ....................................................... B27N 1/006
See application file for complete search history.

(56) References Cited

U.S. PATENT DOCUMENTS

| | | | |
|---|---|---|---|
| 3,542,674 A | 11/1970 | Machlan | |
| 3,636,199 A * | 1/1972 | Jenks et al. | 264/134 |
| 4,368,222 A | 1/1983 | Blegen et al. | |

(Continued)

FOREIGN PATENT DOCUMENTS

| | | | |
|---|---|---|---|
| GB | 856389 | * | 12/1960 |
| WO | WO/2005/000547 A2 | | 6/2005 |

OTHER PUBLICATIONS

Cyr et al., Urea-Melamine-Formaldehyde Resin Diffusion into Medium Density Fiberboard Wood Fibers, Wood Adhesives 2005: Session 2A—Resin Synthesis and Analysis, pp. 135-142.*

*Primary Examiner* — Timothy Meeks
*Assistant Examiner* — Michael P Rodriguez
(74) *Attorney, Agent, or Firm* — Berenato & White, LLC

(57) ABSTRACT

A method of surface sealing a porous fibrous substrate is provided. According to the method, a porous fibrous substrate possessing a moisture content and a surface with pores is provided. A sealant composition is applied to a surface of the porous fibrous substrate and permitted to penetrate the surface pores of the porous fibrous substrate and undergo cure while participating in a foaming reaction with the moisture content to establish a water-resistant polymeric foam sealant impregnated into the porous fibrous substrate. The water-resistant polymeric foam sealant contains a polyurethane and/or polyurea.

18 Claims, 3 Drawing Sheets

(56) References Cited

U.S. PATENT DOCUMENTS

| | | | |
|---|---|---|---|
| 4,503,115 A * | 3/1985 | Hemels et al. | 442/161 |
| 4,731,427 A | 3/1988 | Younes | |
| 5,128,407 A | 7/1992 | Layton et al. | |
| 5,142,835 A * | 9/1992 | Mrocca | 52/309.12 |
| 5,270,412 A * | 12/1993 | Rauterkus et al. | 526/258 |
| 6,335,058 B1 | 1/2002 | Symons | |
| 6,451,384 B1 | 9/2002 | Burrows et al. | |
| 6,620,459 B2 * | 9/2003 | Colvin et al. | 427/303 |
| 6,740,279 B2 | 5/2004 | West et al. | |
| 2003/0064160 A1 * | 4/2003 | Ou et al. | 427/402 |
| 2004/0063891 A1 | 4/2004 | Colvin et al. | |
| 2005/0046064 A1 * | 3/2005 | Halton et al. | 264/46.4 |
| 2005/0126089 A1 * | 6/2005 | Liu | 52/204.1 |
| 2006/0053718 A1 * | 3/2006 | Kelly | 52/409 |

* cited by examiner

METHOD OF SEALING A POROUS FIBROUS SUBSTRATE, AND METHOD OF MAKING A DOOR

CROSS-REFERENCE TO RELATED APPLICATIONS AND CLAIM TO PRIORITY

This application is a National Phase of International Application No. PCT/US2007118932 filed Aug. 28, 2007 and relates to Provisional Application No. 60/840,472 filed on Aug. 28, 2006, the disclosures of which are incorporated by reference and to which priority is claimed.

FIELD OF THE INVENTION

The present invention relates to a method of making consolidated cellulosic door skins and other articles having a sealer coat, and to a method of making a door having a door skin with a sealer coat. The present invention also relates to door skins, doors, and other articles made by the method.

BACKGROUND OF THE INVENTION

Man-made consolidated cellulosic articles, such as fiberboard, may be molded to have either planar or three-dimensional shapes and embossed with various designs and patterns, such as a wood grain appearance of natural wood. Fiberboards are a well known and widely used class of consolidated cellulosic articles that include such materials as hardboard, soft board, and medium-density fiberboard (MDF). Chipboards such as particleboard, medium-density particleboard, and oriented strandboard (OSB) constitute another useful class of consolidated cellulosic articles. Composite structures of these boards are also useful.

Various processes have been practiced to produce consolidated composite articles such as those mentioned above. The principal processes for the manufacture of consolidated composite articles include wet felted/wet pressed or "wet" processes; dry felted/dry pressed or "dry" processes; and wet felted/dry pressed or "wet-dry" processes.

Generally, in a wet process, cellulosic materials such as fibers (e.g., fibrillized wood fibers) are blended in a vessel with large amounts of water to form a slurry. The slurry preferably has sufficient water content to suspend a majority of the cellulosic fibers and preferably has a water content of at least ninety weight percent of the wood fibers. (All percentages disclosed herein are by weight, unless specifically stated otherwise.) The slurry is combined with a synthetic resin binder, such as for example a phenol-formaldehyde resin, and deposited onto a water-pervious support member, such as a fine screen, where much of the water is removed to leave a wet mat. The resulting cellulosic material has a moisture content, for example, of about fifty weight percent based on the dry weight of the cellulosic material. The wet mat is transferred from the pervious support member to a press and consolidated under heat and pressure to form the consolidated composite article, such as a door facing or other desired article.

A wet-dry forming process typically includes blending cellulosic raw material, e.g., wood fibers, in a vessel with large amounts of water having a pH of less than seven to form a slurry. This slurry is then blended with a resin binder. As in the wet process described above, the blend is then deposited onto a water-pervious support member, where a large percentage of the water is removed, thereby leaving a wet mat of cellulosic material having a water content of about fifty weight percent, for example. This wet mat is then transferred to an evaporation zone where much of the remaining water is removed by evaporation. The dried mat preferably has a moisture content of less than about thirty weight percent based on the dry weight of the cellulosic material. The dried mat is then transferred to a press and consolidated under heat and pressure to form the consolidated composite article.

In a dry process, the cellulosic material is generally conveyed in a gaseous stream or by mechanical means rather than a liquid stream. The cellulosic material may be first coated with a thermosetting resin binder, such as a phenol-formaldehyde resin. The cellulosic material is then randomly formed into a mat by air blowing one or more layers of the resin-coated cellulosic material onto a support member. The mat may optionally be subjected to pre-press drying. The mat, typically having a moisture content of less than about thirty weight percent and preferably less than about ten weight percent, is then pressed under heat and pressure to cure the thermosetting resin and to compress the mat into an integral consolidated article.

In the processes described above, the mat is typically consolidated in a press between upper and lower press platens. After compression, the resulting molded article may include a surface intended to be exteriorly disposed, such as a door facing exterior surface. The aesthetic appearance and physical properties of the exterior surface may play important roles in evaluating the quality and functionality of the article. However, the compression process sometimes results in an article having a surface with undesirable qualities. For example, the surface of the article removed from the press may possess imperfections such as cracks, voids and high porosity. Without wishing to be necessarily bound by any theory, it is believed that these defects are generated when the consolidated material "sticks" to the platens as the platens release. These imperfections not only adversely affect the aesthetic quality of the door skin, but also deleteriously affect important properties, such as reducing surface hardness. Even if sufficient press release is achieved, the surface quality of the article may still be inadequate, given the high surface porosity often present in a consolidated cellulosic article.

In order to provide the desired surface characteristics to the finished product, a sealer or finish coat may be applied to the molded article after removal of the molded consolidated composite article from the press. Often, the surface color is also desirably altered by the precursory step of applying a primer to the surface of the molded article, thereby providing a ready-to-finish surface on the composite articles conditioned to accept paint or stain, for example. However, conventional sealers do not adequately fill the relatively large surface cracks, voids, and pores sometimes present in consolidated cellulosic articles. As a result, the consolidate cellulosic articles, even after receipt of a surface treatment, may possess a poor surface seal and high water sensitivity and permit moisture penetration. Articles such as exterior door facings are often exposed to large amounts of water (e.g., rain and high humidity). The penetration of moisture into a poorly sealed surface of a consolidated cellulosic article can lead to fiber swelling, which can manifest as cosmetic blemishes and blistering, making the article commercially unacceptable to discriminating consumers.

SUMMARY OF THE INVENTION

In accordance with the purposes of the invention as embodied and broadly described herein, according to a first aspect of this invention there is provided a method of surface sealing a porous fibrous substrate possessing a moisture content and a surface with pores. The method features applying a sealant composition to the surface of the porous fibrous substrate and permitting the sealant composition to penetrate the surface pores of the porous fibrous substrate. The sealant composition undergoes cure while participating in a foaming reaction with the moisture content to establish a water-resistant polymeric foam sealant impregnated into the porous fibrous substrate. The water-resistant polymeric foam sealant comprises a polyurethane and/or a polyurea.

According to a second aspect of the invention, a sealed article is provided. The sealed article features a porous fibrous substrate possessing surface pores, and a water-resistant polymeric foam sealant selected from a polyurethane and polyurea impregnated in the surface pores of the porous fibrous substrate to establish a water-resistant foam seal.

According to a third aspect of the invention, a method is provided for making a door. The method comprises providing a first door skin comprising a porous fibrous substrate possessing surface pores and a moisture content and having a first interior surface and a first exterior surface. A sealant composition is applied to the first exterior surface, and is permitted to penetrate the surface pores of the porous fibrous substrate and undergo cure while participating in a foaming reaction with the moisture content to establish a water-resistant polymeric foam sealant impregnated into the porous fibrous substrate. The polymeric foam sealant is selected from a polyurethane and polyurea. The first interior surface is attached to a first side of a door frame. A second door facing having a second interior surface and a second exterior surface is provided, and the second interior surface of the second door facing is attached to a second side of the door frame.

A fourth aspect of the invention provides a door comprising a door frame having opposite first and second sides, a first door facing having a first interior surface attached to the door frame and a first exterior surface facing away from the door frame, and a second door facing having a second interior surface attached to the door frame and a second exterior surface facing away from the door frame. At least one of the door facings comprises a sealed article featuring a porous fibrous substrate possessing surface pores, and a water-resistant polymeric foam sealant selected from a polyurethane and polyurea impregnated in the surface pores of the porous fibrous substrate to establish a water-resistant foam seal.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

Figure 1:
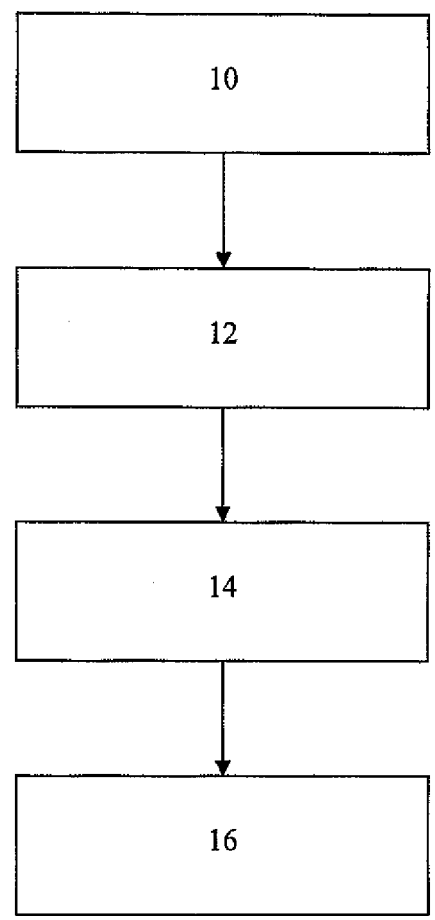
FIG. 1 is a flow diagram of a method according to an embodiment of the invention.

DETAILED DESCRIPTION OF PREFERRED EMBODIMENTS AND PREFERRED METHODS OF THE INVENTION

Reference will now be made in detail to preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods.

Referring more particularly to the illustrated embodiments, FIG. 1 depicts a process according to an embodiment of the invention. At step 10, a porous fibrous substrate possessing surface pores and a moisture content is provided. The porous fibrous substrate is preferably a consolidated cellulosic article, such as a medium density fiberboard particle board, plywood, fiberboard, pegboard, cloth or fabric. Preferably, the cellulosic article contains wood fibers and/or particles.

Figure 2:
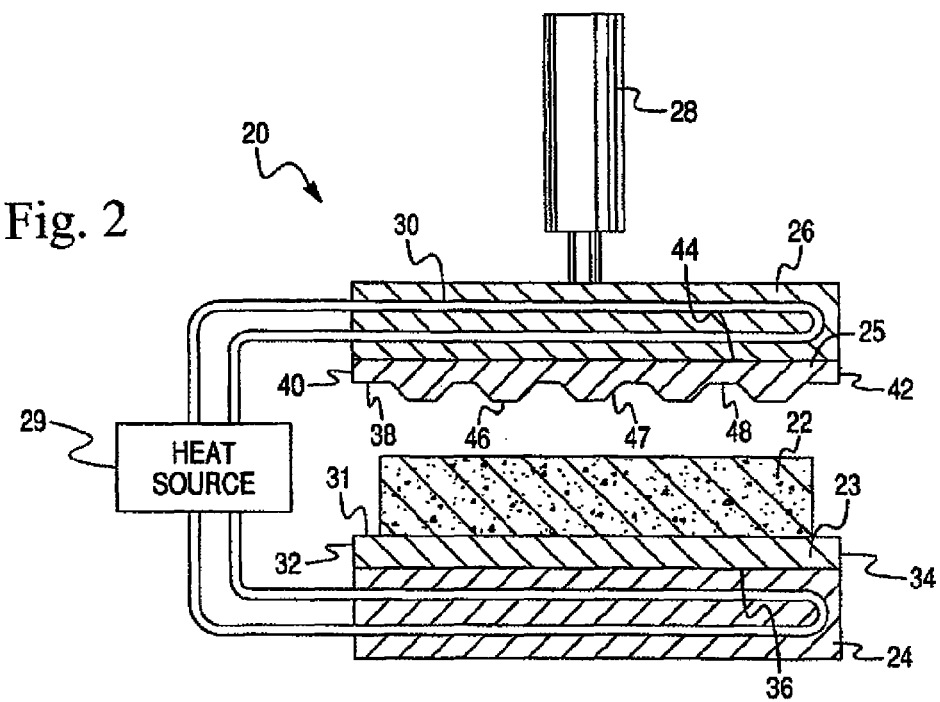
FIG. 2 is a partial cross-sectional view of an apparatus for making a consolidated cellulosic article, depicting the apparatus in a pre-compression state.
Figure 3:
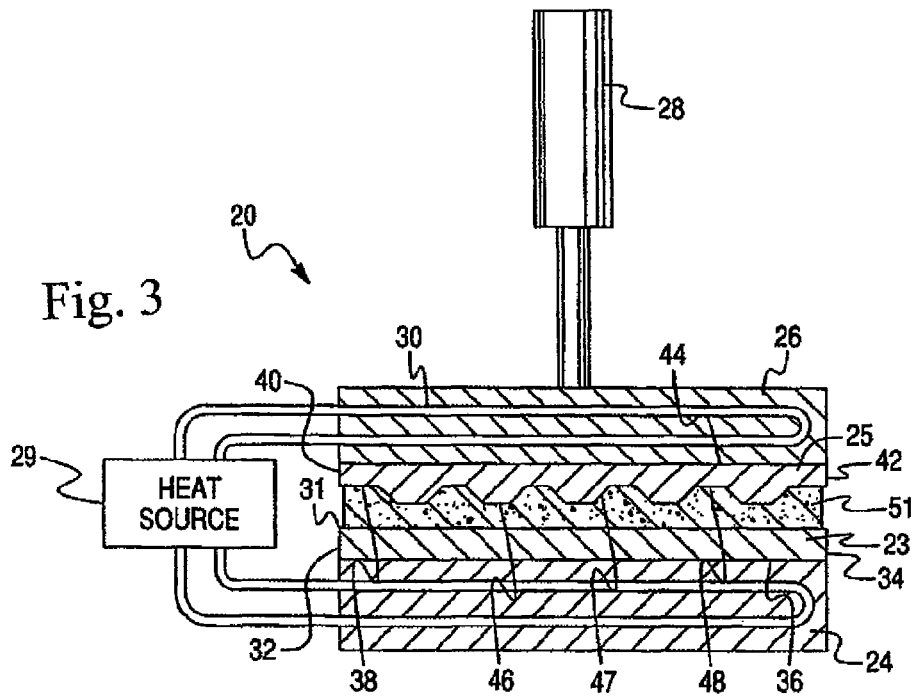
FIG. 3 is a partially cross-sectional view of the apparatus of FIG. 2, depicting the apparatus in a post-compression state.

The porous, fibrous substrate may be manufactured elsewhere or manufactured on site. Suitable manufacturing techniques include the wet processes, dry processes, and wet-dry processes described above. Referring now to FIGS. 2 and 3, an apparatus for forming consolidated cellulosic articles is generally depicted by reference numeral 20. A mat 22 of uncompressed cellulosic material is shown disposed between a first die 23 mounted to a first platen 24, and a second die 25 mounted to a second platen 26.

The facing surfaces of dies 23, 25 may be contoured to emboss desired shapes and/or patterns, e.g., panels, in mat 22. First die 23 includes a substantially flat top 31, sides 32 and 34, as well as a base 36. Second die 25 includes a bottom 38, sides 40 and 42, and a top 44. Second die 25 includes a plurality of forms 46 extending from bottom 38. Forms 46 are uniformly spaced apart by a plurality of voids 48. In the depicted embodiment, the forms 46 are bulbous or frustoconical, having angled, arcuate, or canted sides 47. The angled sides 47 may be at a range of degrees, for example, from about 5 degrees to about 45 degree from vertical. It should be understood that top 31 of first die 23 may possess an identical, complementary, or alternative shape to that of the facing surface of second die 25. Similarly, bottom 38 of second die 25 may be flat. Additionally, the facing die surfaces also may contain tapered sides and other designs, or example, as described in U.S. Pat. No. 6,972,150.

First and second dies 23 and 25 may be manufactured from a suitably hard material such as steel or aluminum, and are mounted to platens 24, 26, respectively, for relative movement toward each other. In the depicted embodiment, the mechanism for moving first and second platens 24 and 26 toward one another is provided in the form of a cylinder 28 attached to second platen 26, which is preferably hydraulic, but which can be provided in other forms, including pneumatic, as well as various forms of linear actuators. First platen 24 is fixed, but a similar cylinder or cylinders may be attached to first platen 24 as well. Each cylinder 28 may be sized to produce a range of pressure outputs, such as in a range of about 3,000 psi to about 5,000 psi. The pressure exerted on mat 22 may be, for example, in a range of about 400 psi to about 1000 psi.

A heat generation mechanism 29 is preferably provided such that mat 22 is compressed under elevated temperatures as well. Heat generation mechanism 29 can take many forms including a source of heated oil or steam circulated through conduits 30 in first and second platens 24, 26 and first and second dies 23, 25. The achieved temperature is typically in a range of about 300° F. to about 500° F. (about 149° C. to about 260° C.), depending on the curing temperature required by the particular binding agent or resin being used.

Mat 22 may be comprised of any number of cellulosic materials and binding agents to result in, when compressed under heat and pressure, a consolidated cellulosic article 51 (FIG. 3). The cellulosic materials within mat 22 may include, but not be limited to, waste materials from lumber mill operations such as sawdust, shavings, and wood chips, or may be provided in the form of specially ground fibers of a specific size or range of sizes. Thus, where fibers are referred to herein, it is understood that other materials could be substituted. The binding agent may be in the form of various adhesives or resins including phenol formaldehyde, urea formaldehyde, melamine modified urea formaldehyde or isocyanic resins. Various materials and methods of manufacturing consolidated cellulosic materials are described in U.S. Pat. Nos. 5,306,539; 5,344,484; 5,367,040; 5,425,976; 5,470,631; 5,489,460; 5,647,934; 5,756,599; and 5,847,058.

FIGS. 2 and 3 show a typical sequence of steps resulting in the formation of the board 51. Mat 22 is provided on first die 23, with second die 25 being spaced away due to cylinder 28 being retracted. Mat 22 is typically provided in a semi-solid state after initial passage through, for example, pre-press rollers (not shown). The semisolid mat 22 is then conveyed into position between first and second dies 23, 25. When cylinder 28 extends, second platen 26 moves toward mat 22, and compresses mat 22 against first die 23. Cylinder 28, second platen 26, and second die 25 are then retracted away from first die 23 and platen 24, and consolidated cellulosic board 51 is removed.

Consolidated cellulosic board 51 will have opposite surfaces matching the surface shapes and contours of first and second dies 23, 25. For example, in the illustrated embodiment forms 46 pressed against mat 22 establish corresponding indented portions in compressed cellulosic board 51. The indented portions are separated by raised portions corresponding to voids 48.

Consolidated cellulosic board 51 may comprise, for example, a fiberboard article (e.g., hardboard or medium density fiberboard (MDF)) or a chipboard article (e.g., particleboard, medium-density particleboard, or oriented strand board (OSB)). Examples of consolidated cellulosic board products include siding, door facings, pegboard, etc. The door facings or skins may be useful for interior and exterior passageway and hallway, as well as for furniture, cabinet and closet doors, and drawers.

Consolidated cellulosic board 51 obtained from the above manufacturing processes will possess pores, voids, and/or cracks. Mean pore size may range, for example, from about 1 micron to about 300 microns, such as from about 20 microns to about 75 microns. Consolidated cellulosic board 51 is preferably characterized by a moisture content sufficient to foam the sealant composition, but preferably less than about 10 weight percent.

In step 12 of FIG. 1, a sealant composition is applied to at least one surface of consolidated cellulosic board 51. The sealant composition preferably comprises a polyurethane and/or polyurea precursor. An exemplary composition is a two-part urethane composition with a polyol first part and a polyisocyanate second part. Examples of suitable polyols include diols and triols, and may be selected from phenolics, polyethers and polyesters. The polyisocyanate may possess two or more isocyanate functional groups, such as MDI (methylene diphenyl diisocyanate), NDI (naphthalene diisocyanate), TDI (toluene diisocyanate), and HDI (hexamethylene diisocyanate). Another exemplary composition is a two-part polyurea composition with a polyamine first part and a polyisocyanate second part. It is within the scope of the invention to employ various compositions for forming the polyurethane and/or polyurea, including compositions containing monomers, oligomers, and/or prepolymers.

The sealant composition may contain additional ingredients, such as chain extenders, blowing agents, flame retardants, and/or fillers.

The preferred application technique is spraying. For example, in the case of a two-part urethane composition, a dual feed spray apparatus with a static mixer at the head of the application gun may be used. Other suitable techniques for applying the sealant composition include dipping, brushing, and rolling. Generally, it is preferred to apply the sealant composition at substantially room temperature without preheating of consolidated cellulosic board 51 or sealant composition. It is preferred that the sealant composition be applied in an amount of about 3 grams/ft$^2$ to about 4.5 grams/ft$^2$ (grams of composition per square foot of porous fibrous substrate), although amounts outside this range are possible. The temperature conditions may be varied, however, depending upon such factors as the reactivity of the sealant composition.

In step 14, the sealant composition is permitted to penetrate the surface pores of consolidated cellulosic board 51 and undergo cure while participating in a foaming reaction with the moisture content of board 51. The cured composition establishes a water-resistant polyurethane and/or polyurea foam sealant impregnated into the pores of consolidated cellulosic board 51. The extent of penetration will be dependent upon several factors, including the pore size of consolidated cellulosic board 51 and the properties, e.g., viscosity, of the sealant composition. It is preferred that the sealant composition penetrate about 50 microns to about 75 microns below the surface of board 51.

In step 16, board 51 may be subjected to further processing, such as milling, shaping, painting, protective coating, hardware (e.g., doorknob, hinges, knocker) attachment, assemblage (e.g., into a door), etc.

Figure 4:
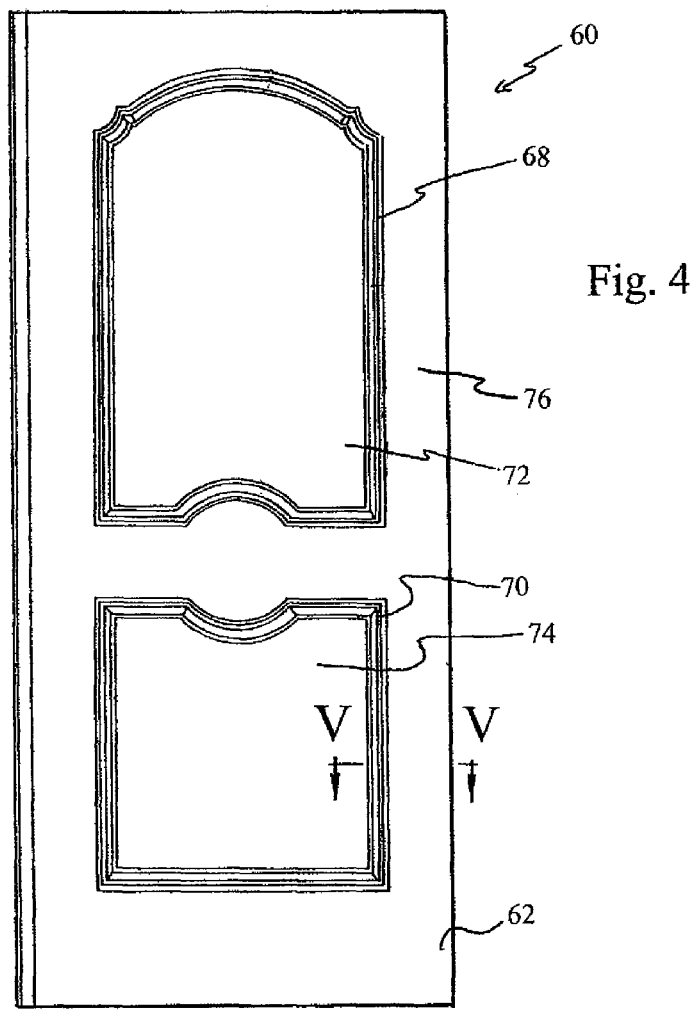
FIG. 4 is an elevated perspective view of an embodiment of a six-panel door in accordance with the invention.
Figure 5:
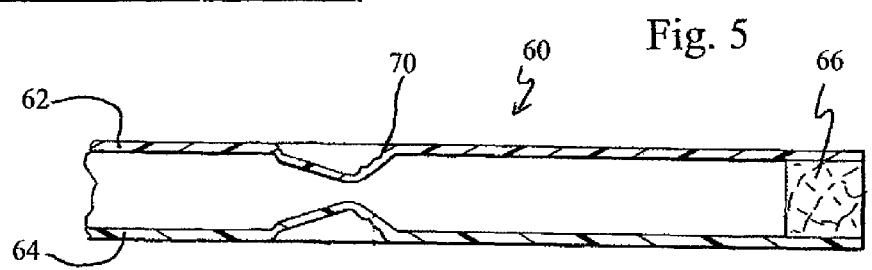
FIG. 5 is a cross-sectional view taken along line V-V of FIG. 4.

FIGS. 4 and 5 illustrate a door, generally designated 60, made according to an embodiment of the invention. Door 60 includes a front door facing (door skin) 62 and an identical, rear door facing (door skin) 64, secured to opposite major surfaces of a door frame or interior support structure 66. Typically, parallel side members, known as stiles, establish opposite sides of door frame 66, and parallel end members, known as rails, establish the top and bottom of door frame 66. The frame members can be made of natural wood, man-made pressed wood, or any other suitable material. Door facings 62, 64 are preferably molded so as to impart aesthetic surface contours, such as wood grain patterning and/or panel structures, in the visible exterior surfaces that correspond to essentially identical contours of a mold cavity, e.g., dies 23, 25. The interior surfaces of door facings 62, 64 are preferably secured, e.g., with an adhesive, to a core component positioned within frame 66.

Door facings 62, 64 shown in FIGS. 4 and 5 are molded to simulate multi-panel door surfaces. The embodiment shown in FIGS. 4 and 5 contains two molded contoured regions 68, 70 that define and surround two panels 72, 74, respectively. Panels 72, 74 are preferably coplanar. Each of the contoured regions 68, 70 is completely surrounded by a substantially planar (e.g., horizontal) main surface portion 76. Optionally, panels 72, 74 lie in the same plane as main surface portion 76.

The exterior surfaces of door facings 62, 64 are sealed according to the invention, and may further be primed, painted, stained, and/or receive other layers and/or protective coatings. Optionally, wood veneers may be bonded to the exterior surfaces to provide the surfaces with the appearance (e.g., color, grain and/or inlay patterns) of natural wood.

Alternatively, an image can be printed on the exterior surfaces of door facings 62, 64, as described in U.S. Pat. No. 7,001,016.

Door 60 is hollow in the middle or is provided with a core. The core, if present, may comprise a foam formed of any suitable polymer material which can be injected and formed in place or can be pre-formed and then placed between door facings 62, 64 and surrounded by frame 66. Other foam materials include, for example, corrugated pads and other insulation and materials. It should be noted that door facings 62, 64 may be adhered to the solid core, if present.

The foregoing detailed description of the certain preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims and their appropriate equivalents.

What is claimed is:

1. A method of surface sealing a consolidated cellulosic article, comprising:
   compressing a mat comprising cellulosic material and a synthetic binding agent into a consolidated cellulosic article having a surface with pores, voids, and/or cracks, wherein the mat is compressed under an elevated temperature in the range of 300 to 500° F., the binding agent comprising at least one member selected from the group consisting of a phenol formaldehyde, a urea formaldehyde, a melamine modified urea formaldehyde, and an isocyanic resin; and
   applying a sealant composition to the surface of the consolidated cellulosic article and permitting the sealant composition to penetrate the surface pores, voids, and/or cracks and undergo cure while participating in a water-based foaming reaction to establish a water-resistant polymeric foam sealant impregnated into the consolidated cellulosic article, wherein the sealant composition is applied to the surface and the foaming reaction occurs at substantially room temperature, the water-resistant polymeric foam sealant comprising a member selected from the group consisting of a polyurethane and polyurea, the water for the water-based reaction originating with the consolidated cellulosic article.

2. The method of claim 1, wherein the sealant composition comprises a two-part polyurethane composition comprising a first part containing a polyol, and a second part containing a polyisocyanate.

3. The method of claim 1, wherein the sealant composition comprises a two-part polyurea composition comprising a first part containing a polyamine, and a second part containing a polyisocyanate.

4. The method of claim 1, wherein said applying comprises spraying the sealant composition on the consolidated cellulosic article.

5. The method of claim 1, wherein said applying establishes about 3 grams to about 4.5 grams of the polymeric foam sealant per square foot of the consolidated cellulosic article.

6. The method of claim 1, wherein the pores of consolidated cellulosic article possess a mean pore size of about 1 micron to about 300 microns.

7. The method of claim 1, wherein the sealant composition penetrates about 50 to about 75 microns below the surface of the consolidated cellulosic article.

8. The method of claim 1, wherein the consolidated cellulosic article comprises a door skin.

9. The method of claim 8, wherein the door skin is embossed with a wood grain pattern and comprises at least one panel region.

10. The method of claim 1, wherein the consolidated cellulosic article comprises medium density fiberboard.

11. A method of surface sealing a consolidated cellulosic article, comprising:
    compressing a mat comprising cellulosic material and a binding agent into a consolidated cellulosic article having a surface with pores, voids, and/or cracks, wherein the mat is compressed under an elevated temperature in the range of 300 to 500° F., the cellulosic material comprising at least one material selected from the group consisting of sawdust, shavings, and wood chips, the binding agent comprising at least one member selected from the group consisting of a phenol formaldehyde, a urea formaldehyde, a melamine modified urea formaldehyde, and an isocyanic resin; and
    applying a sealant composition to the surface of the consolidated cellulosic article and permitting the sealant composition to penetrate the surface pores, voids, and/or cracks and undergo cure while participating in a moisture-initiated foaming reaction to establish a water-resistant polymeric foam sealant impregnated into the consolidated cellulosic article, wherein the sealant composition is applied to the surface and the foaming reaction occurs at substantially room temperature, the water-resistant polymeric foam sealant comprising a member selected from the group consisting of a polyurethane and polyurea, the moisture for the moisture initiated reaction originating with the consolidated cellulosic article.

12. The method of claim 11, wherein the sealant composition comprises a two-part polyurethane composition comprising a first part containing a polyol, and a second part containing a polyisocyanate.

13. The method of claim 11, wherein the sealant composition comprises a two-part polyurea composition comprising a first part containing a polyamine, and a second part containing a polyisocyanate.

14. The method of claim 11, wherein said applying comprises spraying the sealant composition on the consolidated cellulosic article.

15. The method of claim 11, wherein said applying establishes about 3 grams to about 4.5 grams of the polymeric foam sealant per square foot of the consolidated cellulosic article.

16. The method of claim 11, wherein the pores of consolidated cellulosic article possess a mean pore size of about 1 micron to about 300 microns.

17. The method of claim 11, wherein the sealant composition penetrates about 50 to about 75 microns below the surface of the consolidated cellulosic article.

18. A method of surface sealing a consolidated cellulosic door skin, comprising:
    compressing a mat comprising cellulosic material and a binding agent into a consolidated cellulosic door skin having a surface with pores, voids, and/or cracks, wherein the mat is compressed under an elevated temperature in the range of 300 to 500° F., the cellulosic material comprising at least one material selected from the group consisting of sawdust, shavings, and wood chips, the binding agent comprising at least one member selected from the group consisting of a phenol formaldehyde, a urea formaldehyde, a melamine modified urea formaldehyde, and an isocyanic resin; and applying a sealant composition to the surface of the consolidated cellulosic door skin and permitting the sealant composition to penetrate the surface pores, voids, and/or cracks and undergo cure while participating in a water-based foaming reaction to establish a water-resistant polymeric foam sealant impregnated into the consolidated cellulosic door skin, wherein the sealant composition is applied to the surface and the foaming reaction occurs at substantially room temperature, the water-resistant polymeric foam sealant comprising a member selected from the group consisting of a polyurethane and polyurea, the water for the water-based reaction originating with the consolidated cellulosic article.

* * * * *